(12) United States Patent
Yost

(10) Patent No.: US 8,224,714 B2
(45) Date of Patent: Jul. 17, 2012

(54) PEER TO PEER NETWORK PERSONAL ASSISTANT

(75) Inventor: David Yost, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 12/113,875

(22) Filed: May 1, 2008

(65) Prior Publication Data

US 2009/0276284 A1    Nov. 5, 2009

(51) Int. Cl.
*G06Q 40/00*    (2012.01)
(52) U.S. Cl. ............. 705/26.7; 705/26.1; 705/319
(58) Field of Classification Search .......... None
See application file for complete search history.

(56) References Cited

U.S. PATENT DOCUMENTS

| | | | |
|---|---|---|---|
| 6,321,211 B1 | 11/2001 | Dodd | |
| 6,609,106 B1 | 8/2003 | Robertson | |
| 6,895,558 B1 | 5/2005 | Loveland | |
| 7,117,168 B2 | 10/2006 | Eaton | |
| 7,603,292 B1 * | 10/2009 | Bragg et al. | 705/26 |
| 2002/0143664 A1 * | 10/2002 | Webb | 705/27 |
| 2004/0162830 A1 | 8/2004 | Shirwadkar | |
| 2004/0254855 A1 | 12/2004 | Shah | |
| 2005/0091120 A1 | 4/2005 | Auletta | |
| 2005/0119947 A1 | 6/2005 | Lin | |
| 2006/0020662 A1 * | 1/2006 | Robinson | 709/203 |
| 2009/0132387 A1 * | 5/2009 | Majdoub | 705/27 |

FOREIGN PATENT DOCUMENTS

WO    0031657 A2    6/2000

OTHER PUBLICATIONS

"Birthday Calendar Application Reaches 2 Million Users in One Month on Facebook (R) Platform," http://www.bigdates-solutions.com/news.asp, San Ramon, CA, Feb. 13, 2008, 3 pp.
"Your New Best Friend...thedoghouse.co.uk," http://thedoghouse.co.uk/FAQs.asp, Feb. 13, 2008, 3 pp.
"Reminder Spot," http://www.reminderspot.com/about/birthday_reminder_service.asp, Feb. 13, 2008, 1 p.

* cited by examiner

*Primary Examiner* — Jason M Borlinghaus
(74) *Attorney, Agent, or Firm* — Shook, Hardy & Bacon L.L.P.

(57) ABSTRACT

Methods and computer storage media for communicating an electronic gift suggestion for a first user to a second user are provided. Accessing an online social network profile for a first user created by the first user in an online social network. Determining one or more gift suggestions for the first user and displaying the one or more gift suggestions in the online social network account of a second user. In some embodiment, the gift suggestions for the first user may be based on the social profile of the first user, based on the social profile of the first user utilizing an electronic gift wish list, or based on sales data of purchasers having similar personal information and purchasing history as personal information accessed from the first user's social profile.

18 Claims, 7 Drawing Sheets

PEER TO PEER NETWORK PERSONAL ASSISTANT

SUMMARY

Embodiments of the present invention relate to computer-readable media and method for providing a personal assistant on a peer-to-peer social network to remind users of upcoming events and provide gift suggestions for events for which a gift is needed. An electronic gift suggestion for a first user is communicated to a second user in an online social network. The gift suggestion is based on information provided in the user profile of the first user. The information provided by the first user may be varied and can range from actual gift suggestions to a wish list or no information at all. The information may include the first user's demographics, interests, purchase history, etc. The gift suggestions are tailored to the first user based on the information and presented to the second user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Exemplary Operating Environment

Figure 1:
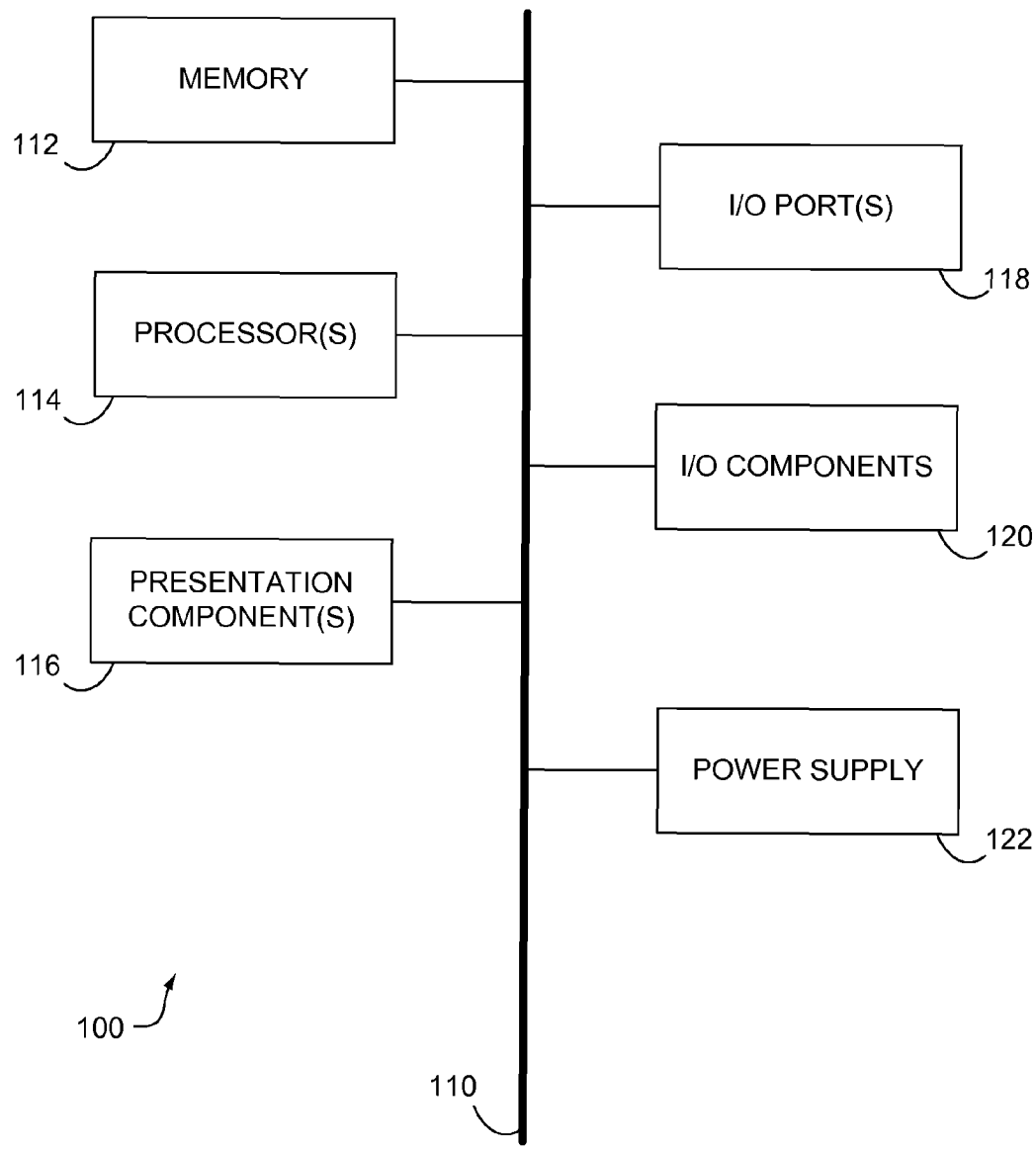
FIG. 1 is a block diagram of a computing system environment suitable for use in implementing the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/modules illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

Embodiments of the present invention enable a user to receive a reminder and gift suggestions for another user. The gift suggestions may be created from a variety of inputs.

In a first aspect, computer-readable storage media performs a method of communicating an electronic gift suggestion for a first user to a second user. A social profile is accessed for the first user which is created by the first user in an online social network. Gift suggestions are determined based on the social profile. The gift suggestions are provided to the second user. The second user participates in the online social network.

In another aspect, computer-readable storage media performs a method of electronically suggesting a gift for a first user. Inputs about the first user are received from a second user. The second user desires to receive a gift suggestion for the first user. Factors associated with the first user are evaluated in order to determine the gift suggestion. The factors include analyzing a purchasing history of the first user, a social profile of the first user, a wish list of the first user, and a history of advertisements viewed by the first user. The gift suggestion is determined from the one or more factors. The gift suggestion is provided to the second user.

In yet another aspect, a method for automatically suggesting a gift near a specified date is provided that includes accessing a social profile associated with a first user in an online social network. The social profile includes personal and demographic information. Third-party websites are accessed to retrieve sales data associated with persons similar to the first user or gift choices for persons similar to the first user. The sales data or the gift choices are received to perform an analysis to determine gift suggestions. The gift suggestions are provided to the second user. The second user participates in the online social network.

Figure 2:
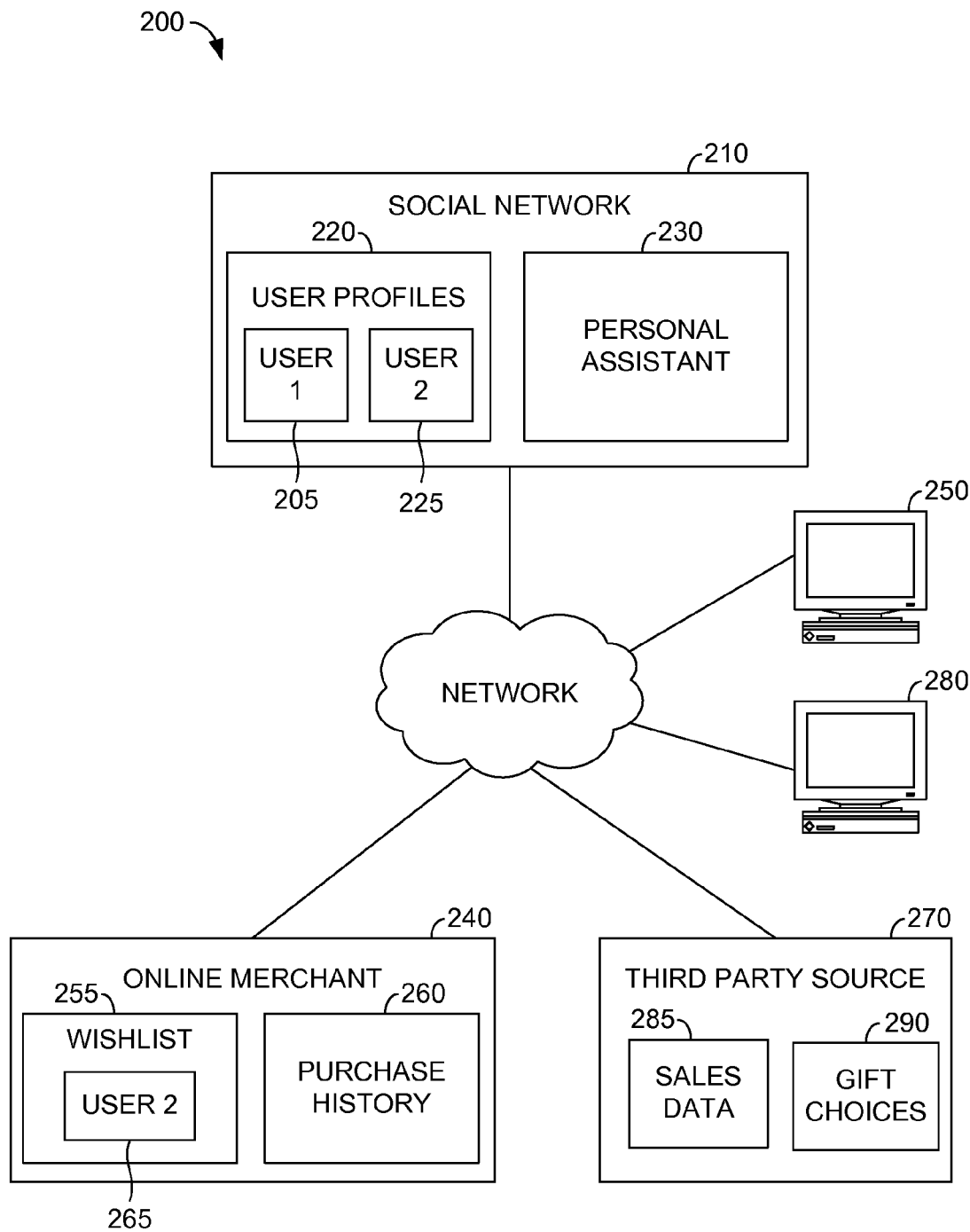
FIG. 2 is a block diagram illustrating an exemplary network that may be used in accordance with an embodiment of the invention.

With reference to FIG. 2, a block diagram is provided that illustrates an exemplary environment for a peer-to-peer network personal assistant to provide event reminders and gift suggestions. It should be understood that this and other arrangements described herein are set forth only as examples. Other arrangements and elements (e.g., machines, interfaces, functions, orders, and groupings of functions, etc.) can be used in addition to or instead of those shown and some elements may be omitted altogether. Further, many of the elements described herein are functional entities that may be implemented as discrete or distributed components or in conjunction with other components, and in any suitable combination and location. Various functions described herein as being performed by one or more entities may be carried out by a processor executing instructions stored in memory.

In FIG. 2, an exemplary environment 200 is shown with network components, such as one or more social networks 210, one or more online merchants 240 and one or more third party data sources 270 and user devices 250 and 280 connected to a network 205. One skilled in the art will recognize that there are a variety of communication methods that may encompass network 205, including but not limited to: the Internet, analog telecommunications network, private data networks, and wireless type networks. Common to all of these networks is their ability to facilitate the transmission of data and information between one or more network components.

It is understood that this and other arrangements described herein are set forth only as examples. Each of the components shown in FIG. 2 may be any type of computing device or reside on a computing device, such as computing device 100 described with reference to FIG. 1, for example. Furthermore, it will be appreciated that the network components may reside on separate computing devices or multiple components may reside on a single computing device. Social network 210, online merchant 240 and third party data source 270 are communicatively coupled to the network 205. It will be appreciated that while being depicted a separate network components, that social network 210, online merchant 240 and third party data source 270 may be combined.

Figure 3:
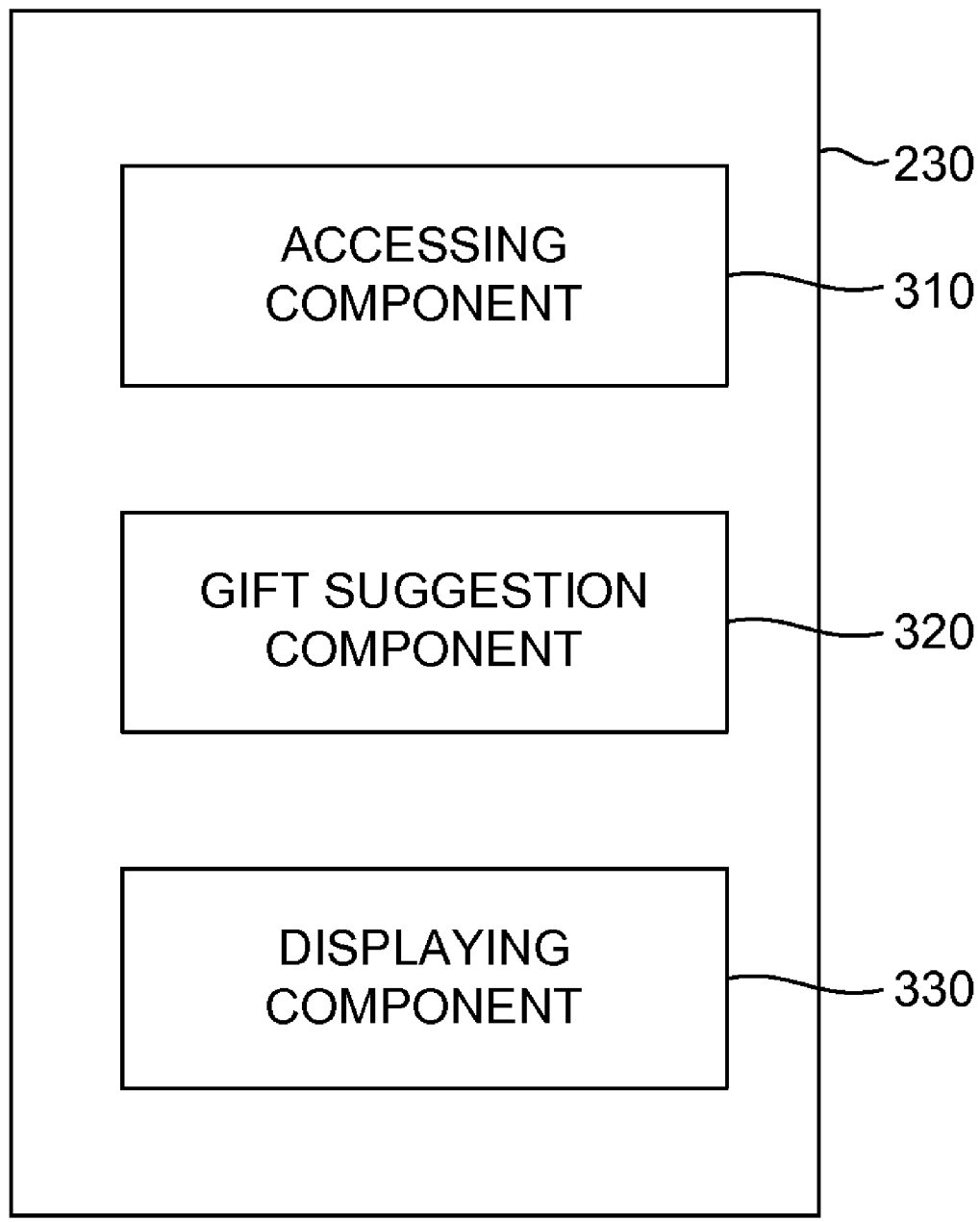
FIG. 3 is a block diagram illustrating components of a personal assistant in accordance with an embodiment of the invention.

Social network 210 allows users to communicate with each other. Exemplary social network 210 includes peer-to-peer networks that allow users to maintain social relationships. Examples of social networks include but are not limited to FACEBOOK by Facebook, Inc. of Palo Alto, Calif., MYSPACE by MySpace Inc. of Beverly Hills, Calif., and FRIENDSTER by Friendster, Inc. of Sunnyvale, Del. Social network 210 may allow users to share pictures, videos, instant message one another, blog, and the like. In one embodiment, social network 210 includes user profile module 225 and personal assistant module 230. Social network 210 allows users to establish relationships with each other and store information about each other in their contact list which may be located in their user profiles module 225. Social network 210 includes a personal assistant 230 that assists users with event reminders and/or gift suggestions. Referring to FIG. 3, personal assistant 230 may include an accessing component 310, gift suggestion component 320 and displaying component 330.

Personal assistant 230 provides a social network user 250 with reminders of upcoming events and suggests appropriate gifts for those events and users for whom a gift would be appropriate. Personal assistant 230 reminds users when an event occurs, and leverages information stored about the gift recipient in the peer-to-peer network to make relevant gift suggestions. For example, personal assistant 230 may remind a user 250 of an approaching birthday for a recipient (another user) 280 (such as a friend or family member of the user), and provide suggestions to user 250 for gifts for recipient 280.

The gift ideas may be highly customized based on information for the recipient 280 from the recipient's peer-to-peer social network profile 225. The gift suggestions may be based on demographic information in the user profile 225, a wish list 265 or link to a wish list in the user profile 225, on the types of products purchased by the second user 280 in the user profile 225 and combinations thereof. In one embodiment, accessing component 310 accesses the second user's network profile 225 and gift suggestion component 320 suggests gifts for the second user.

Personal assistant 230 may also allow users to create a wish list 265 or link to a wish list created on online merchant site so that when an event comes around (e.g., a birthday, anniversary, new baby, wedding), the gift buying user 250 is presented with suggestions desired by the second user 280. "Wish lists" from other online merchants 240 may linked or aggregated in user profile 225. In one embodiment, multiple wish lists from multiple online merchants may be aggregated into a single wish list contained in user profile 225.

Online merchant 240 may include but are not limited to auction sites, wholesalers, retailers, search site, and consolidators. Many online merchants allow users to create and store wish lists 255 of items that they would like to have. Many of these wish lists can be linked to or may be referenced in user profiles 225 on the social network 210.

Displaying component 330 of FIG. 3, displays the gift suggestions for a second user to a first user in the first user's social network account. Once presented with one or more gift suggestions for second user 280, user 250 may purchase a suggested gift item for the second user 280. In one embodiment, the purchasing user 250 clicks "buy and ship" and either enters billing information or the system utilizes stored billing information for the purchasing user 250 to purchase a suggested item. A stored shipping or electronic mail address for the gift receiving second user 280 may be utilized for delivery of the gift to the second user 280. The billing information for purchasing user 250 and gift and addresses for gift receiving second user 280 may be accessed from the online merchant 240 or one of the user's social network profiles. The recipient's wish list may be updated to reflect that the gift has been purchased so that the gift receiving user 280 does not receive duplicate items.

When the personal assistant 230 encounters someone that does not have a populated wish list or link to a wish list, personal assistant 230 may utilize demographic information about the user from their profile 220 to provide gift suggestions. Demographic information for the user may include interests, likes, dislikes, age, sex, social-economic status, health and the like. Utilizing demographic information from the user profile 220, personal assistant 230 may access third party sales data 285 to make gift suggestions for the gift recipient user 280. For example, a third-party sales data 285 from a data source 270 may suggest that women from ages 30-50 purchase a particular brand of shoes. The personal assistant 230 may determine that the gift recipient user 280 is a 35 year old woman. As such, personal assistant 230 may suggest to user 250 to purchase the particular brand of shoes as a gift for second user 280. In another example, the personal assistant 230 may utilize third party gift choices 290 to provide gift suggestions based on user interests. Thus, if the third party gift choices 290 show that 80% of men with interests in video games have Halo 3 videogame on their wish list and that gift recipient user 280 is a man interested in video games, the personal to utilize this information to provide a gift suggestion to user 250 to purchase Halo 3 for gift recipient user 280.

In yet another embodiment, personal assistant 230 may utilize prior purchase history of second user 280. Some online merchants 240 track of users' purchase history 260. This information may be leveraged by a personal assistant 230 to determine what a user has bought and help to determine a gift suggestion for second user 280. For example, if second user 280 has purchased history books in the past, personal assistant 230 may utilize this information and available product information to suggest one or more history books to user 250 as gift suggestions for second user 280.

In one embodiment, an event may be displayed to user 250 for a gift recipient not connected to social network 210 or does not have information in their user profile 220. As such, the purchasing user 250 may enter information about the intended gift recipient. The amount of information can vary and may include things such as the recipient's age, sex, or interests. The personal assistant 230 may utilize the entered information, sales data 285 and/or gift choice data 290 to make a gift suggestion.

In another embodiment, the personal assistant 230 may also suggest items for a user 250 to buy for themselves. The personal assistant 230 may use data from the user's profile 205 to make purchasing suggestions. For example, the personal assistant 230 may use data from the user's profile 205 and data from contacts of the user 250 to provide purchasing suggestions to the end user 250. For example, if five (5) of the social network contacts of the user 250 have purchased the video game HALO 3, personal assistant 230 may display a message to user 250 stating that "5 of your friends now have Halo 3" in the user's social network account. User 250 may be motivated to buy the suggested item in order to play the video game online with the social network contacts of the user 250

Figure 4:
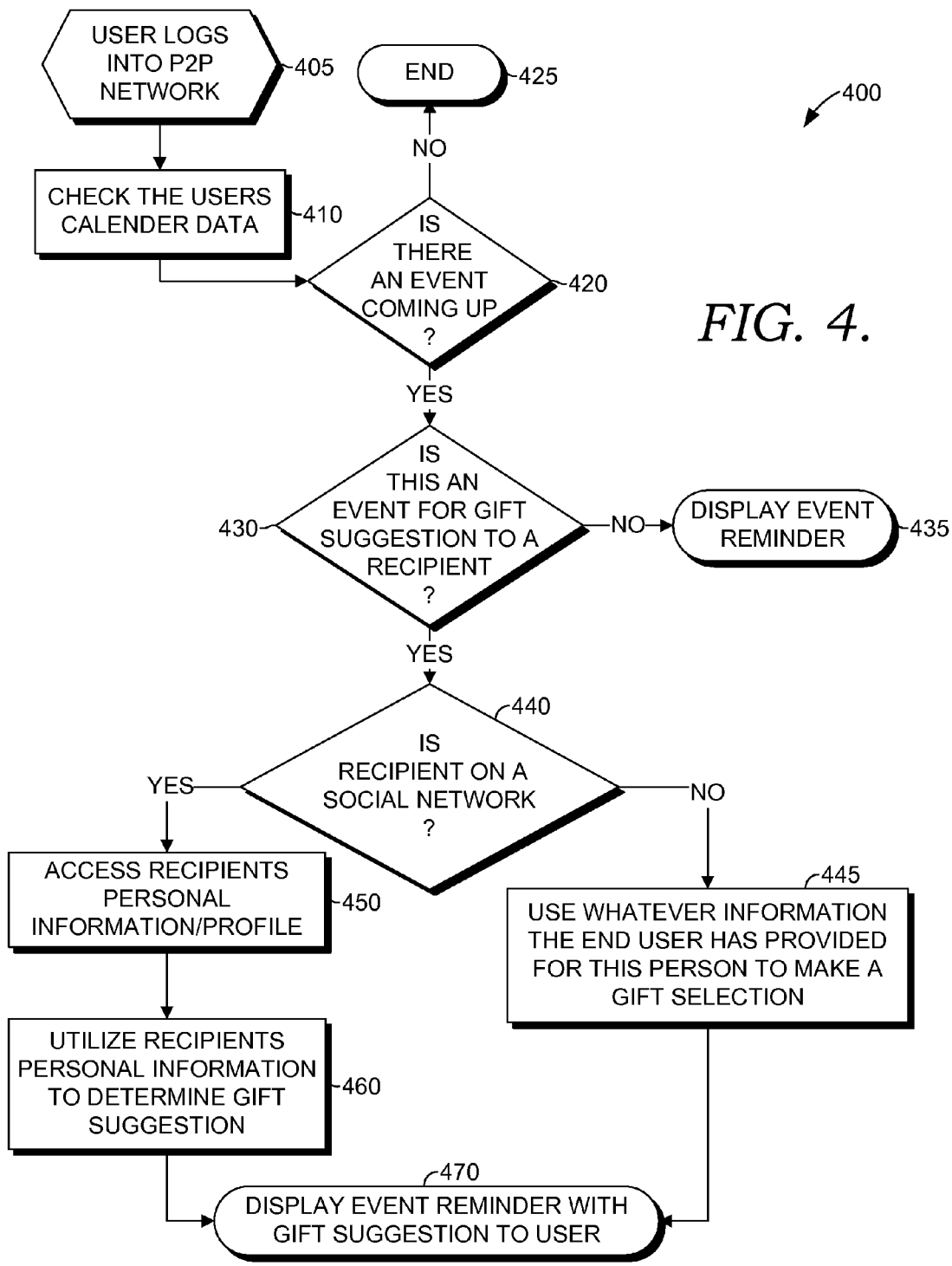
FIG. 4 is a flowchart illustrating an exemplary process for displaying gift suggestions for a recipient to another user using the recipient's social network profile in accordance with an embodiment of the present invention.
Figure 5:
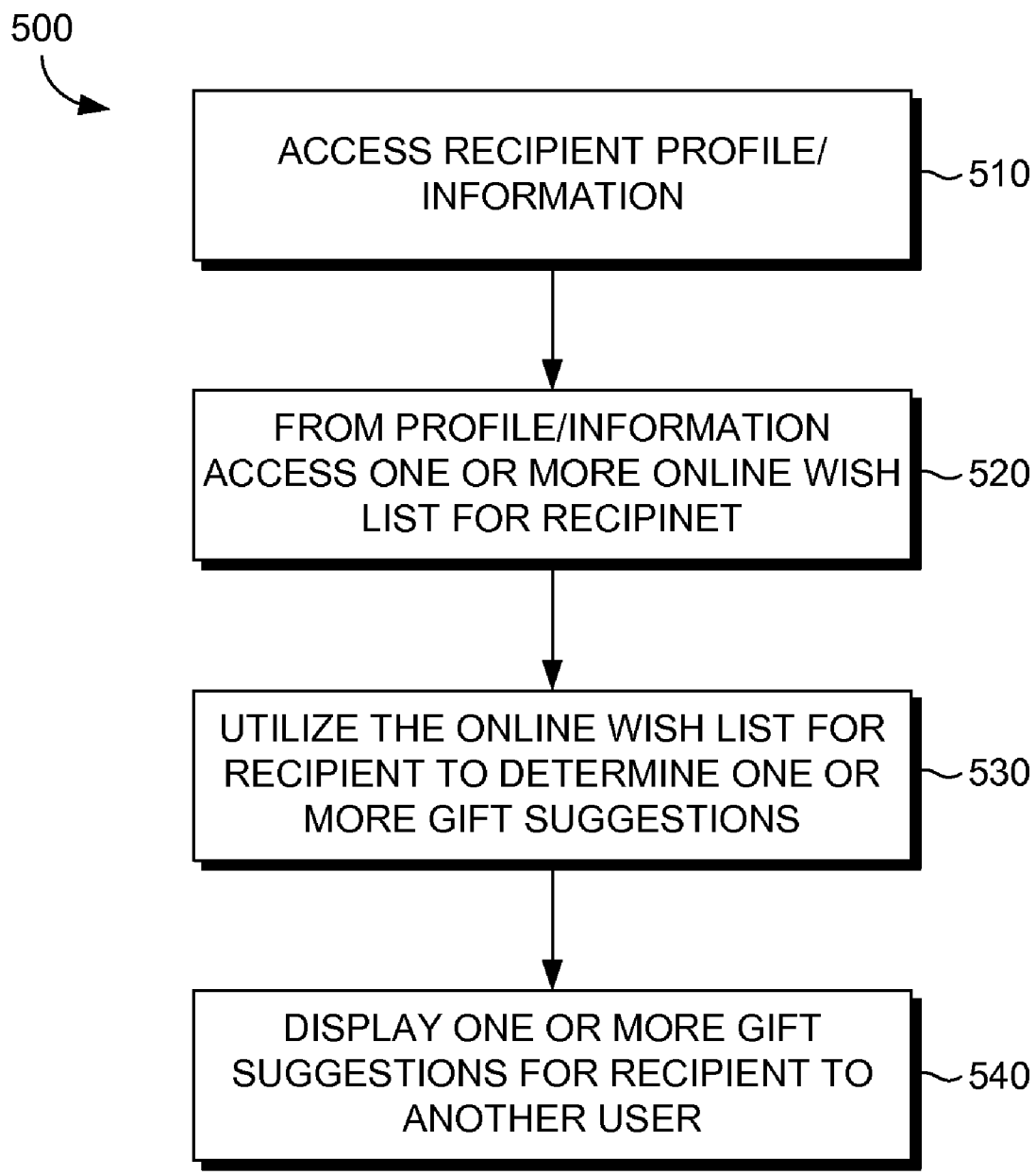
FIG. 5 is a flowchart illustrating an exemplary process for displaying gift suggestions for a recipient to another user from a wish list linked to the recipient's social network profile in accordance with an embodiment of the present invention.
Figure 6:
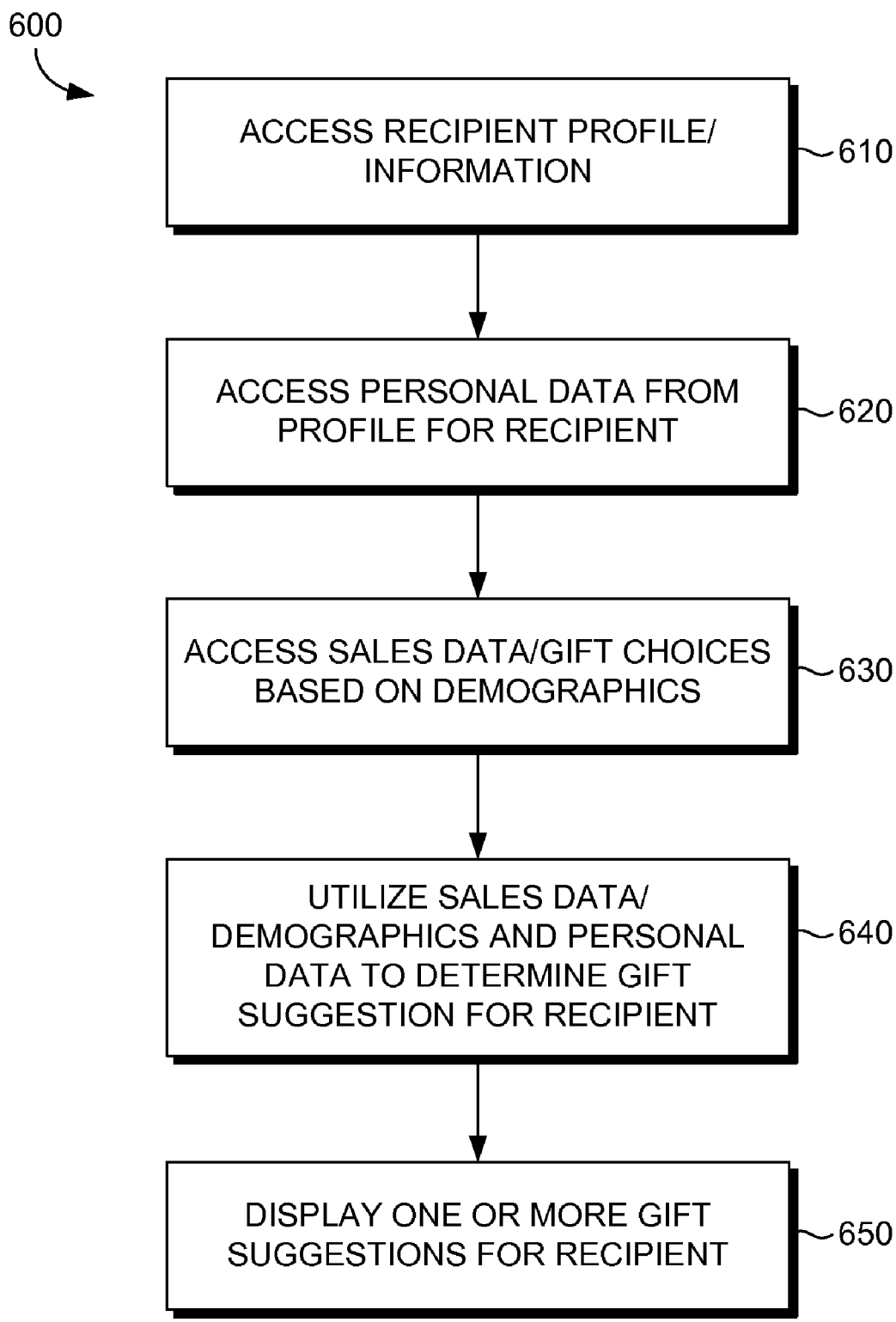
FIG. 6 is a flowchart illustrating an exemplary process for displaying gift suggestions for a recipient to another user when implementing an embodiment of the present invention.

FIGS. 4, 5 and 6 are flow diagrams that depict several exemplary computer implemented processes for displaying gift suggestions to a social network user. Turning now to FIG. 4, exemplary process 400 depicts an exemplary method for displaying gift suggestions to a user. At step 405 a user accesses a peer to peer social network 220. This may be done by entering login information, and in some instances, a password. In one embodiment, the user enters his or her account with social network 220. The user's account may include a variety of information including information for user contacts, user pictures, user videos, a calendar with events relevant to user and the like. For example, as user may keep important dates such as birthdays, anniversaries, wedding dates and the like stored in the user's calendar within the social network. It will be appreciated that the user's calendar may be stored in a variety of ways known to those in the art. Furthermore, it will be appreciated that information and important dates on the user's calendar may be entered by the user, downloaded from another source or linked to from other user profiles (e.g., the profiles of the user's contacts may be linked to the user's profile and the important dates and calendar data may be accessed from the profiles of the user's contacts).

At step 410, the user's calendar and/or important dates contained in the user's social network 220 account are accessed. At step 420, it is determined whether there are any upcoming events for the user. For example, it may be determined whether there are any birthdays or anniversaries for friends and family members of the user. If there are not any upcoming events, the process ends at step 425. If there are upcoming events at step 420, it is determined whether the event may include gifts for a recipient. For example, an upcoming business meeting on the user's calendar may not include a gift but the birthday of the user's spouse may include gifts.

If at step 430 it is determined that the event does not require gifts, at step 435 an event reminder may be displayed to the user. If the event is gift appropriate at step 430, it is determined whether the recipient participates in a social network at step 440. For example, it may be determined whether the recipient associated with the event (e.g., birthday, anniversary, baby shower, wedding, wedding shower, etc.) has an account with a social network 210. If the recipient is not connected with a social network 210, the information that the user has provided about the recipient is used to determine a gift suggestion at step 445 and the event reminder and the gift suggestion is displayed at step 470.

If the recipient is a part of or member of a social network 210, personal information for the recipient is gathered at step 450 from his or her user profile 225. The information from the user profile may be a wish list 255 or link to an online wish list for the recipient. In one embodiment, personal data and/or demographic data for the recipient is accessed from the recipient's user profile. In another embodiment, information from the user's profile is utilized to determine the user's prior purchasing history.

At step 460, information from the recipient's user profile is utilized to determine one or more gift suggestions. At step 470, the gift suggestions are displayed to the user. In one embodiment, the gift suggestions may be presented and/or displayed first to the recipient for approval before being displayed to the user via the user's social network account. The gift suggestions for the recipient may be presented with an event reminder to the user.

With reference to FIG. 5, a method 500 for displaying one or more gift suggestions for a recipient to another user is shown. At step 510 the recipient's user profile on the social network is accessed. At step 520, the user profile may contain a wish list of items that the user has registered for and would like to receive. The wish list may be a list of items from one or more online merchants. Alternatively, the user profile may contain a link or pointer to one or more gift wish lists for the user.

At step 530, information from the wish list(s) is used to determine one or more gift suggestions for the recipient. At step 540, the one or more gift suggestions for the recipient are displayed in the social network account of another user.

Referring next to FIG. 6, a computer implemented method 600 for displaying one or more gift suggestions for a recipient is provided. At step 610, the recipient's user profile on the social network is accessed. At step 620, personal and/or demographic data for the recipient is accessed for the recipient's online social network profile. Demographic information for the recipient may include interests, likes, dislikes, age, sex, social-economic status, health and the like. At step 630, sales data and/or gift choices for others with similar demographic information is accessed. For example, third-party sales data 285 may be accessed. At step 640, the sales data and personal or demographic data is utilized to determine one or more gift suggestions for recipient. For example, gift choices of similar people with similar personal interests or characteristics to recipient may be matched to recipient to determine one or more gift suggestions. At step 650, the one or more gift suggestions are displayed in the online social network account of a user other than the gift recipient. In one embodiment, the gift suggestions may be presented to the recipient for approval before being displayed to another user.

Figure 7:
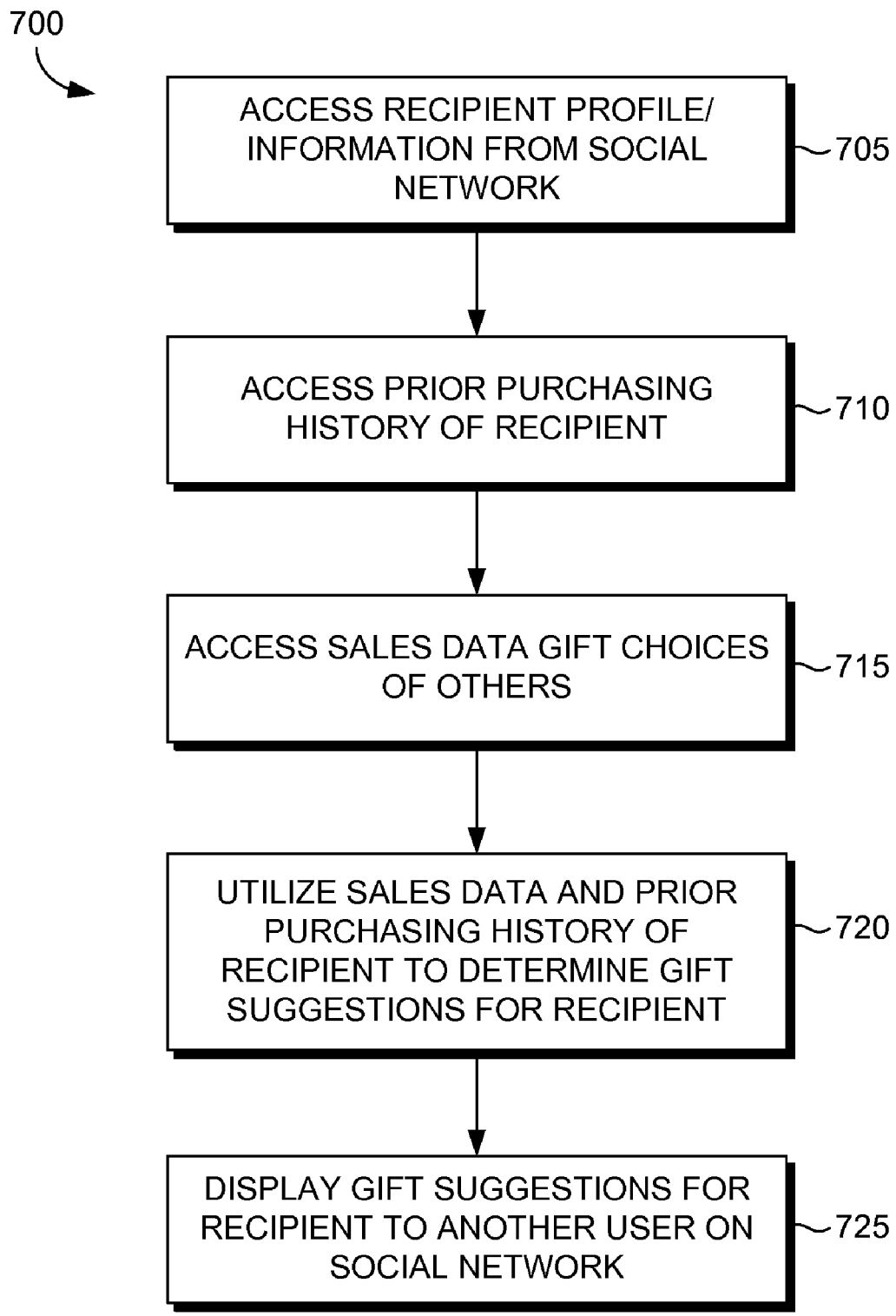
FIG. 7 is a flowchart illustrating an exemplary process for displaying gift suggestions for a recipient to another user when implementing an embodiment of the present invention.

With reference to FIG. 7, a computer implemented method 700 for displaying gift suggestions for a recipient to another social network user is provided. At step 705, the recipient's user profile on the social network is accessed. At step 710, the prior purchasing history of the recipient is accessed. The recipient's prior purchasing history may be accessed directly from the recipient's online social network account or profile. In another embodiment, a link to the user's purchasing history with one or more online merchants may be provided in the recipient's online social network profile. In another embodiment, a link may be provided in the recipient's online social network profile to a database that contains the recipient's prior purchasing history. At step 715, sales data for third parties may be accessed. For example, the sales data may show that purchasers who purchase cosmetics online also tend to purchase accessories, such as handbags, online as well. At step 720, utilizing the third party sales data and the prior purchasing history for the user, one or more gift suggestions for the recipient are determined. At step 725, the one or more gift suggestions are displayed to a user, other than the recipient, in the user's online social network account and/or profile.

The present invention has been described in relation to particular embodiments, which are intended in all respects to be illustrative rather that restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combination are of utility and may be employed without reference to other features and sub-combinations. This is contemplated by and is within the scope of the claims.

The invention claimed is:

1. One or more computer-readable storage media having computer-readable instructions embodied thereon for performing a method of communicating an event reminder with an electronic gift suggestion for a first user to a second user, the method comprising:

determining from a calendar of an online social network account of the second user, an upcoming event for the first user for which one or more inputs about the first user were previously received from the second user and stored by the second user in the calendar of the second user's online social network account as a reminder to the second user of the first user's upcoming event;

automatically determining that the first user's upcoming event is an event for a gift suggestion based on the one or more inputs about the first user that was previously received from the second user and stored by the second user in the calendar of the second user's online social network account, wherein the one or more inputs include a type of event;

determining whether the first user participates in an online social network;

in response to determining that the first user's upcoming event is an event for a gift suggestion and that the first user does not participate in an online social network, determining one or more gift suggestions for the first user based on the received inputs;

in response to determining that the first user's upcoming event is an event for a gift suggestion and that the first user participates in an online social network, automatically accessing an online social network profile for the first user created by the first user in an online social network;

determining from the online social network profile whether the first user has an electronic gift wish list associated with the online social network profile;

in response to determining that the first user has an electronic gift wish list associated with the online social network profile automatically without input from the second user accessing the electronic gift wish list of the first user and determining one or more gift suggestions for the first user based the electronic gift wish list of the first user associated with the online social network profile of the first user;

in response to determining that the first user does not have an electronic gift wish list associated with the online social network profile matching at least one of demographic and historical data in the online social network profile of the first user to at least one of demographic and historical sales data from one or more third-party databases and determining one or more gift suggestions for the first user based on the matching sales data; and displaying the event reminder with the one or more gift suggestions in the online social network account of the second user.

2. The media of claim 1, wherein the first user and the second participate in a same online social network or different online social networks.

3. The media of claim 2, wherein the same online social network or the different online social networks are peer-to-peer networks.

4. The media of claim 1, wherein the one or more inputs received from the second user comprises receiving one or more dates associated with the first user and receiving an entry in a contact list of the second user.

5. The media of claim 3, wherein the first user and the second user are the same.

6. The media of claim 1, wherein the electronic gift wish list of the first user associated with the online social network profile of the first user is one or more of an electronic gift wish list of the first user in the online social network profile of the first user and an electronic gift wish list of the first user linked to the online social network profile of the first user.

7. The media of claim 1, wherein the one or more gift suggestions for the first user determined based on data in the online social network profile of the first user are based on demographic information for the first user in the online social network profile and third party sales data.

8. The media of claim 1, wherein the one or more gift suggestions for the first user determined based on data in the online social network profile of the first user are based on prior purchasing data in the online social network profile of the first user and third party sales data.

9. One or more computer-readable storage media having computer-useable instructions embodied thereon for performing a method of electronically suggesting one or more gifts for a first user, the method comprising:

determining on a calendar of an online social network account of the second user, an upcoming event for the first user for which one or more inputs about the first user were previously received from the second user and stored by the second user in the calendar of the second user's online social network account as a reminder to the second user of the first user's upcoming event;

automatically determining that the first user's upcoming event is an event for a gift suggestion based on the one or more inputs about the first user that was previously received from the second user and stored by the second user in the calendar of the second user's online social network account, wherein the one or more inputs include a type of event;

determining whether the first user participates in an online social network;

in response to determining that the upcoming event is an event for a gift suggestion and that the first user does not participate in an online social network, determining one or more gift suggestions for the first user based on the received inputs;

in response to determining that the first user's upcoming event is an event for a gift suggestion and that the first user participates in an online social network, automatically accessing an online social network profile for a first user created by the first user in an online social network;

automatically without input from the second user accessing an electronic gift wish list of the first user and determining one or more gift suggestions for the first user based on the electronic gift wish list of the first user, wherein the electronic gift wish list of the first user is in the online social network profile of the first user or linked to the online social network profile of the first user; and displaying the one or more gift suggestions in the online social network account of a second user.

10. The media of claim 9, further comprising:

displaying an event reminder and the one or more gift suggestions to the second user.

11. The media of claim 9, wherein the electronic gift wish list for the first user is from an online merchant.

12. The media of claim 9, wherein the first user and the second participate in a same online social network or different online social networks.

13. The media of claim 9, wherein the same online social network and the different online social networks are peer-to-peer networks.

14. The media of claim 9, wherein the second user selects the one or more gift suggestions displayed and purchases a product from the gift wish list of the first user.

15. A computer-implemented method for automatically displaying gift suggestions, the method comprising:

determining from a calendar of an online social network account of the second user, an upcoming event for the first user for which one or more inputs about the first user were previously received from the second user and stored by the second user in the calendar of the second user's online social network account as a reminder to the second user of the first user's upcoming event;

determining that the first user's upcoming event is an event for a gift suggestion and that the first user participates in an online social network;

in response to determining that the first user's upcoming event is an event for a gift suggestion and that the first user participates in an online social network, automatically accessing a social profile for a first user in an online social network, wherein the online social network profile includes personal information for the first user;

accessing one or more third-party databases to retrieve at least one of sales data of purchasers having one or more items of personal demographic information or purchasing history that match one or more items of personal demographic information or purchasing history of the first user;

utilizing the sales data and the purchasing history to determine one or more gift suggestions for the first user; and displaying the one or more gift suggestions in the online social network account of a second user.

16. The media of claim 15, wherein accessing the one or more third-party databases comprises accessing one or more online merchant databases.

17. The media of claim 16, wherein the first user and the second user are members of an online social network which is a peer-to-peer network.

18. The media of claim 17, wherein the first user and the second user are the same.

* * * * *